April 12, 1949. T. B. MARTIN 2,466,775
PROPELLER CONTROLLER

Filed May 29, 1944 3 Sheets-Sheet 2

INVENTOR
Thomas B. Martin
BY
Spencer, Hardman & Fehr
ATTORNEYS

April 12, 1949.　　　　T. B. MARTIN　　　2,466,775
PROPELLER CONTROLLER

Filed May 29, 1944　　　　　　　　　　　3 Sheets-Sheet 3

INVENTOR
Thomas B. Martin
BY
ATTORNEYS

Patented Apr. 12, 1949

2,466,775

UNITED STATES PATENT OFFICE 2,466,775

PROPELLER CONTROLLER

Thomas B. Martin, Dayton, Ohio, assignor to General Motors Corporation, Detroit, Mich., a corporation of Delaware Application May 29, 1944, Serial No. 537,844

20 Claims. (Cl. 264—3)

This invention relates to control of aircraft propellers by fluid actuated governing mechanism, and has for an object to improve manual adjustment linkage for the governing valve.

Another object is to perfect sealing of a hydraulic regulator for pitch control mechanism.

Another object of the invention is to provide a manual adjustment for automatically operating governor mechanism that will lend itself to manipulation while the regulator is rotating with the device that it is to control.

Yet another object of the invention is to provide a rotatable reservoir containing control apparatus that is capable of adjustment from a remote point yet having a reservoir that is substantially sealed against loss of fluid operating medium.

Further objects and advantages of the present invention will be apparent from the following description, reference being had to the accompanying drawings wherein a preferred embodiment of the present invention is clearly shown.

Figure 1:
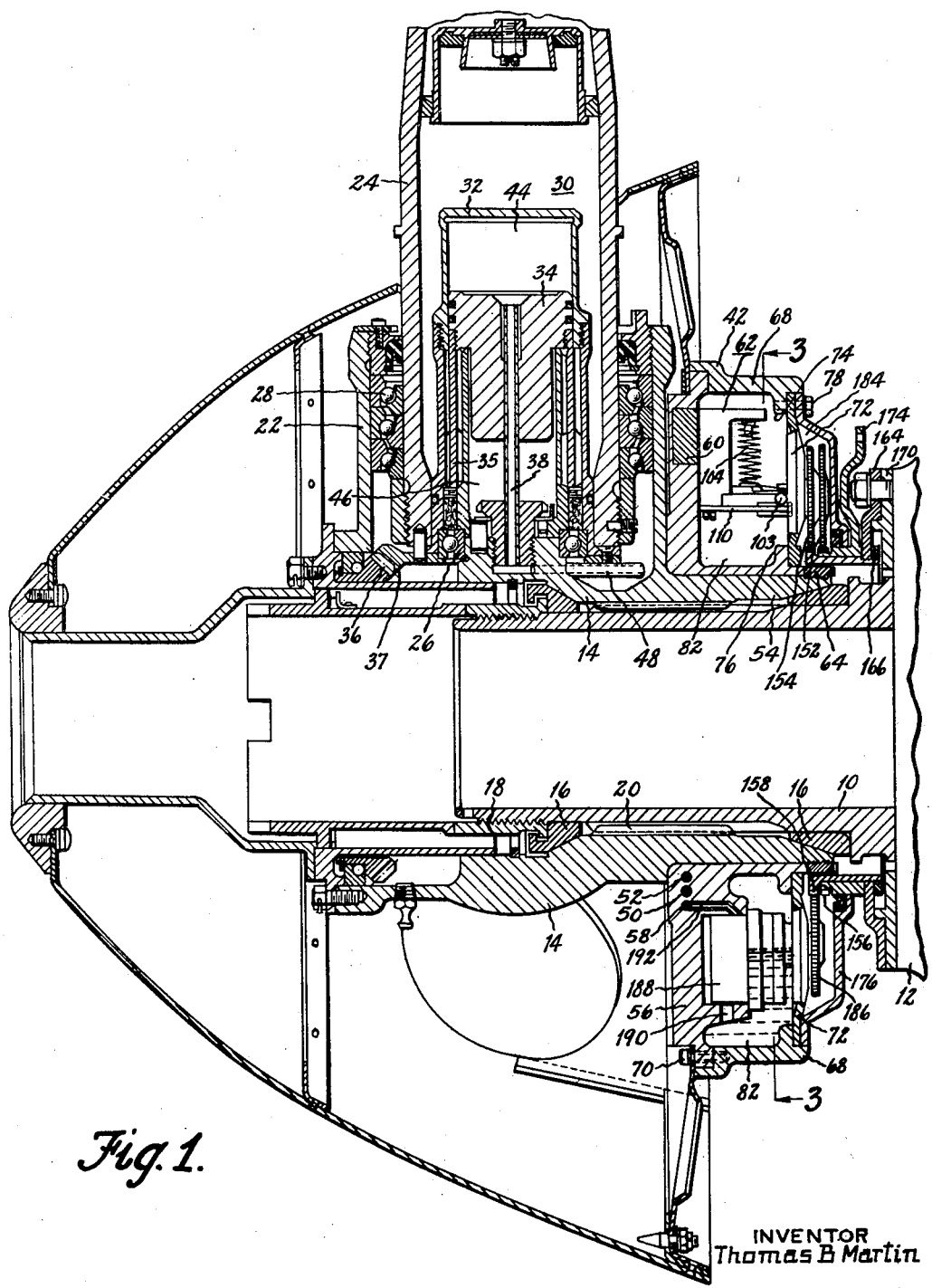
Fig. 1 is a longitudinal sectional view through a propeller mechanism incorporating the instant invention.

With particular reference to the drawings, 10 indicates a power driven shaft rotatably supported by an engine nosing 12, and the shaft is drivingly fitted to a propeller hub 14 by means of cone seats 16 and shaft nut 18 that maintains the propeller hub on the shaft and in engagement with driving splines 20. The propeller hub 14 provides a plurality of sockets 22 retaining blades 24 capable of rotation about their longitudinal axes for pitch adjustment, due to their bearings 26 and 28. Each blade houses a torque unit 30 comprising a cylinder 32 and a piston 34 having a spiral spline engagement with a hollow spindle 35 and with the cylinder, so that movement of the piston 34 in and out of the cylinder 32, or radial of the rotating shaft 10 effects pitch change in the respective blade, the movement of all of the blades of the propeller being coordinated or made to track by means of a master gear 36 meshing with each blade gear 37.

Figure 2:
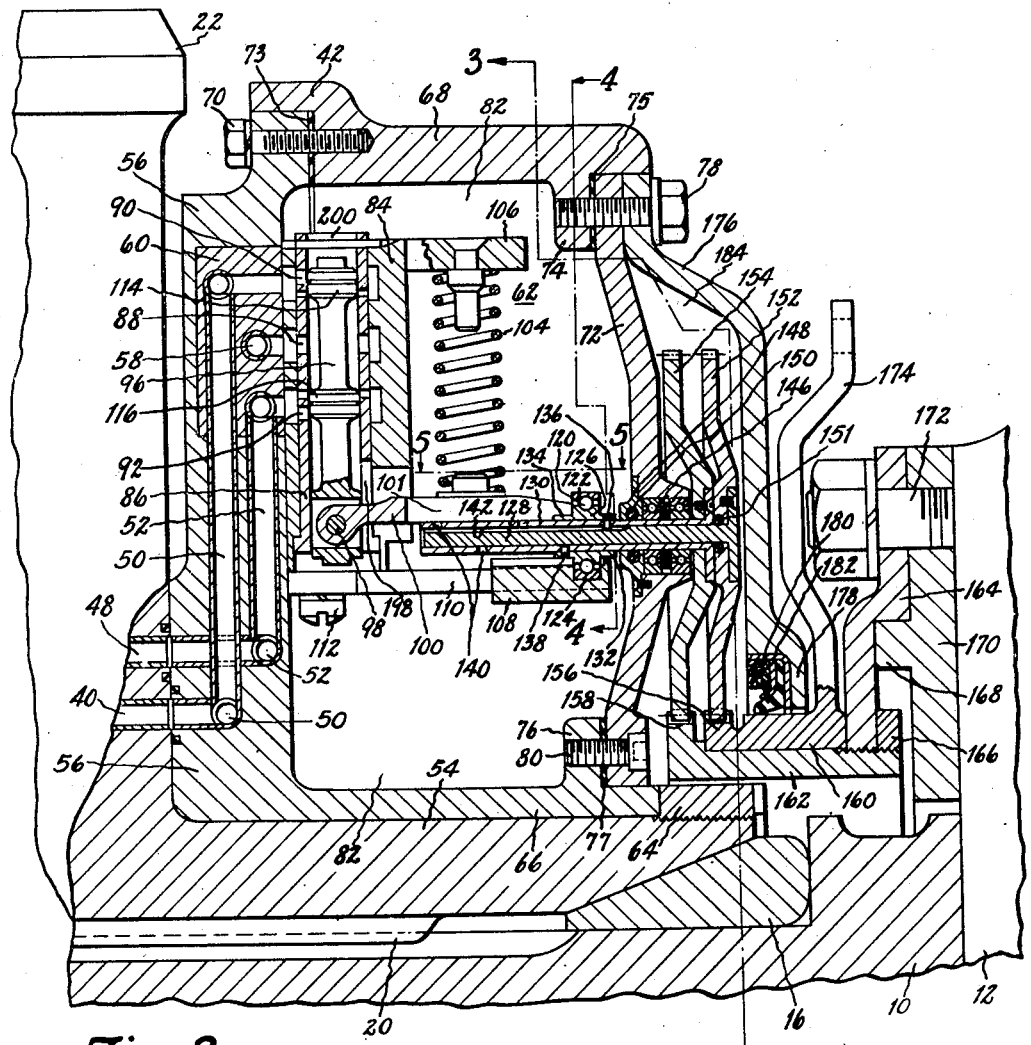
Fig. 2 is an enlarged sectional view through the control of governor valve unit, substantially as indicated by the line and arrows 2—2 of Fig. 3.
Figure 5:
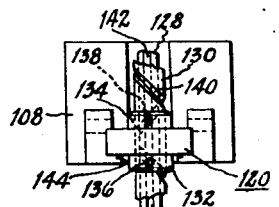
Fig. 5 is a fragmentary plan view of the carriage actuating means, substantially as indicated by the line and arrows 5—5 of Figs. 2 and 4.
Figure 3:
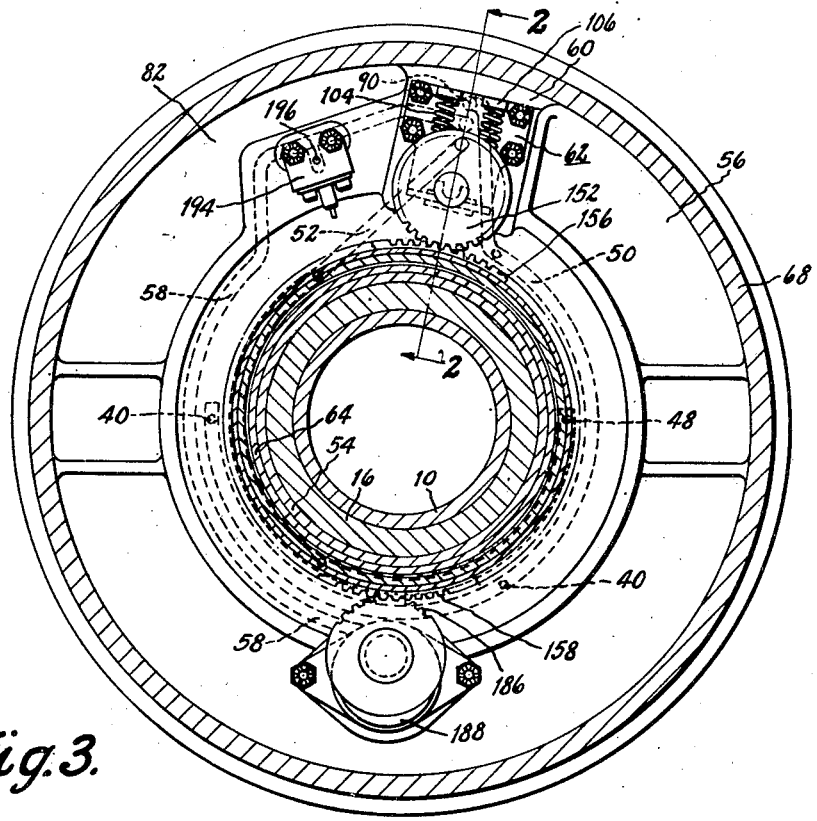
Fig. 3 is a transverse sectional view of the propeller mechanism substantially as indicated by the line and arrows 3—3 of Fig. 1 and Fig. 2.
Figure 4:
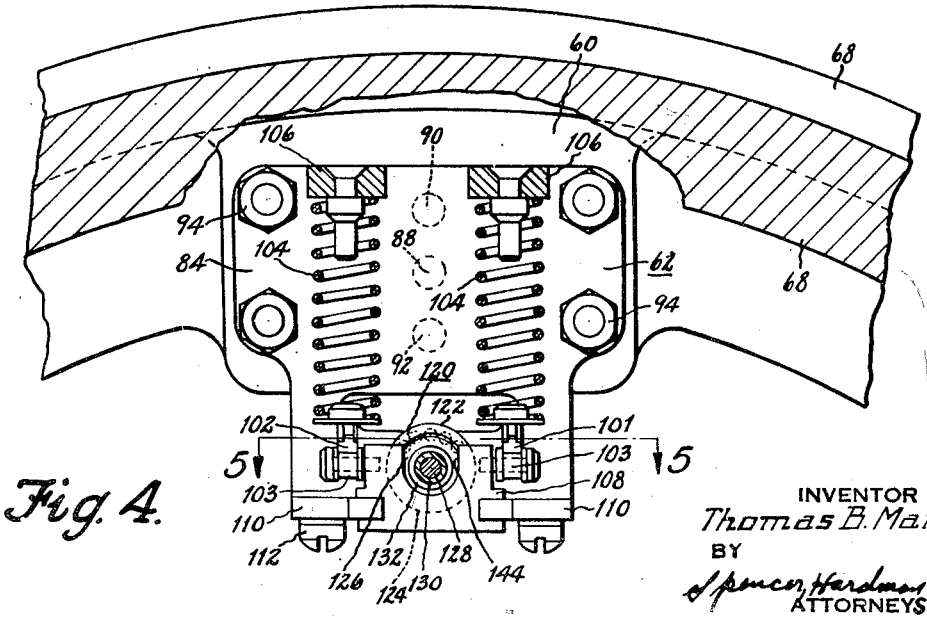
Fig. 4 is an enlarged view, partly in section and partly in elevation, substantially as indicated by the line and arrows 4—4 of Fig. 2.

Movement of the piston in either direction along the axis of the cylinder is effected by a source of fluid pressure that finds its way to either side of and away from either side of the piston 34 through appropriate passages, in which the flow of fluid is controlled by appropriate governor valve mechanism. One such passage is shown as comprising a tube 38 fixed to the hub 14 and over which the piston 34 slides, the tube having connection with a pipe 40 leading to a regulator mechanism 42. This conveys fluid under pressure to the chamber 44 on the outside end of the piston 34, and similar connections may connect with the chamber 46 at the inside end of the piston, but in all events the pipe 40 and its companion 48 make connection with control passages 50 and 52 of a regulator mechanism further to be described, as shown in Figs. 2 and 3.

The regulator mechanism 42 constitutes a reservoir or annular chamber mounted on a rear extension 54 of the hub 14, and designed to rotate with the propeller, it contains a body of fluid medium and control apparatus for effecting blade angle change in accordance with predetermined conditions. An annular plate 56 has the control passages 50 and 52 embedded therein along with a pressure supply passage 58 and convenient mounting pads and juncture blocks which facilitate the mountign of control elements and cross connection of passages. One of such pads is indicated at 60 which is adapted for mounting a governor valve mechanism 62 that controls distribution of fluid under pressure from the pressure passage 58 to either of the control passages 50 and 52. The regulator plate 56 is held in position on the hub extension 54 by means of a sleeve nut 64 thrusting against the end of a sleeve 66 joined to the plate 56. The plate 56 is surrounded by a ring member 68 where it is held in sealed relation by screw devices 70, while the open end of the ring is closed off by a second ring 72 seating on a flange 74 of the ring 72 and a flange 76 of the sleeve 66 by means of screw devices 78 and 80 respectively. Gaskets 73, 75 and 77 may be used to perfect the sealing. That structure provides an annular chamber 82 substantially rectangular in cross section, that surrounds the shaft 10 to form a sealed reservoir charged with pressure operating medium such as a light oil. A comparable structure is the propeller control mechanism described in U. S. patent to Blanchard et al. 2,307,102 to which reference is here made for more detailed description and operation. However in said patent there is not an absolute seal of the reservoir since an adapter assembly carried by the engine nosing extends into the reservoir where it closes the reservoir by means of running seals carried by the regulator plate and cover member, and is capable of breathing, which gives rise to some leakage of the hydraulic fluid especially while the apparatus is at rest. There the adapter assembly provides a wall portion of the reservoir, and does not provide a rigidly closed and substantially absolute seal which is highly desirable.

The governor valve mechanism 62 comprises a chambered block 84 housing a porting sleeve 86 having sets of ports 88, 90 and 92 in communication with the passages 58, 40 and 48 respectively when the unit is clamped in place over the mounting pad 60 by the screw devices 94. Movable along the bore of the porting sleeve 86 is a valve plunger 96 having pivotal connection at 98 to a forked lever 100, whose parallel arms 101 and 102 rest upon fulcrum rollers 103 under the urge of springs 104 thrusting from extensions 106 of the block 84. A reciprocable carriage 108 mounts the fulcrum rollers 103 and is movable along a pair of rigid ways 110 secured to and projecting from the opposite end of the valve body or block 84, by means of screw devices 112. The valve plunger 96 has a pair of lands 114 and 116 normally disposed to cover the ports 90 and 92 when the valve is in the equilibrium position such as shown in Fig. 2. The block 84 is so mounted upon the plate 56 that the porting sleeve 86 and its cooperating valve plunger 96 will be disposed along a radius of the hub assembly and so that centrifugal force due to rotation of the propeller structure will tend to cast the valve plunger 96 radially outward against the opposing force of the spring 104. Thus, centrifugal force effective upon the valve plunger and lever is opposed by the spring force of 104, both acting through the effective length of the lever resting upon the fulcrum rollers 103. The effective length and the relative lengths of the moment arms of the opposing forces are capable of selected change by moving the fulcrum along the length of the lever 100, which thereby changes the speed level at which the centrifugal force applied to the valve system will just balance the force exerted by the spring 104.

Selected positioning of the fulcrum 103 is accomplished by means capable of shifting the carriage 108 along the ways 110, and here incorporates an anti-friction bearing 120 whose outer race 122 is disposed in a half-moon groove 124 of the carriage 108 while the inner race member 126 of the bearing is slidably receptive of a pair of concentric shafts 128 and 130, the inner race having flanges 132 and 134 into which are set pins 136 and 138 respectively extending into a spiral slot 140 of the outer shaft 130. One of the pins, such as 136, also extends through the outer shaft 130 into an axial or straight groove 142 of the inner shaft 128, such that relative rotation between the shafts 128 and 130 will effect movement of the bearing 120 and consequently the carriage 108 along the length of the concentric shafts. The carriage 108 is appropriately notched at 144 to allow passage of the shafts and the shafts are firmly supported for rotation by bearing means 146 disposed in the ring member 72 of the regulator housing. The bearing is retained in place by a gland 148 that incorporates a fluid seal 150 to prevent leakage from the reservoir 82 about the shaft 130. The concentric shafts being so supported, extend between the parallel arms 101 and 102 of the lever which are so spaced as to permit movement of the bearing 120 along the concentric shafts without interfering with the action of the lever system.

Relative rotation of the shafts 128 and 130 is accomplished, when desired, by effecting relative rotation between gears 152 and 154 secured to the shafts 128 and 130 respectively, which gears are constantly in mesh with toothed flanges 156 and 158 respectively provided by concentric sleeves 160 and 162 rigidly supported from the nosing 12. A fluid seal 151 is disposed between the gears 152 and 154 and surrounding the shaft 128 so as to stop escape of fluid medium between the concentric shafts. The sleeve 162 is threadedly engaged in a ring member 164 where it is secured by a lock nut 166, the ring member being positioned about the pilot flange 168 of a ring 170 secured to the nosing 12 by the screw devices 172 which also firmly and rigidly retain the ring 164 and its attached sleeve 162 against rotation. The sleeve 160 is in fact journalled about the sleeve 162 between the toothed flange 158 and the ring 164 and has an arm 174 extending therefrom by which the sleeve 160 may be rotated about the sleeve 162 from such point as the cock-pit of the plane. For covering of the gears between the concentric shafts and the concentric sleeves there is an offset ring 176 secured to the periphery of the regulator housing 68 beneath the screw devices 78, which ring has its inner bounds 178 channelled to receive a lubrication seal 180 that is urged by a spring device 182 to engage the outer surface of the sleeve 160 but is adapted under rotating conditions to lessen its frictional contact. Thus, the gearing is normally enclosed in an annular chamber 184 outside of the reservoir.

Inclosed within the same chamber 184 and meshing with the toothed flange 158 there is a pump driving gear 186 that is also mounted in a bearing provided by the ring 72 to drive a pump 188 enclosed within the reservoir 82 and designed to withdraw fluid medium from the reservoir through an intake port at 190 and discharge the same through 192 into the pressure passage 58 heretofore described. The pump shaft in passing through the ring member 72 is sealed in a manner similar to that of the bearing for the governor control shafts at 150. Thus, while the propeller mechanism is in operation the pump 188 supported by the regulator is caused to revolve with it about concentric sleeves 160, 162 extending into the gear chamber 184 where the pump gear 186 rolls over the stationary toothed flange 158 which effects continued operation of the pump to supply fluid under pressure to the passage 58. Since the supply of pressure fluid delivered by the pump is in excess of the amount usually needed for control functions of the blade pitch changing mechanism, the pressure passage 58 is provided with a relief valve 194 that delivers the excess fluid back into the reservoir 82 through a port 196. However, the pressure passage 58 is always supplied with fluid under pressure which always is present in the porting sleeve 86 between the lands 114 and 116.

Rotation of the propeller mechanism will also revolve the fulcrum shifting mechanism about the concentric sleeves 160, and 162 so that the gears 152, and 154 will roll over the stationary toothed flanges 156, and 158. When there is no relative rotation between the toothed flange there will be no relative rotation between the gears 152, and 154, and consequently no rotation between the concentric shafts 128 and 130 to which they are fixed. Thus, the concentric shafts will rotate as a single element within the bearing 146 and 120. It is desired that the bearing 120 be so characterized by fixing the plane of the ball devices between the two races to be slightly off the perpendicular to the axis of shaft rotation. When this is done, the bearing 120 will act somewhat as a wabble-plate, and upon rotation of the concentric shafts will give a very slight fore and aft movement of the carriage 108 which tends to eliminate static friction to movement of the valve plunger 96 along the sleeve 86. The valve plunger is therefore in a state of animation, and in a condition to be moved from the equilibrium position to uncover either ports 90 or 92 at the least domination of either the centrifugal force on the valve or the spring force on the lever. A domination of centrifugal force, that is when the valve plunger moves outwardly, means an increase of propeller speed, and is corrected by the valve being so positioned as to permit application of the fluid under pressure in the passage 58 flowing into the control passage 50 through the port 90 which actuates the torque unit 30 to effect an increase in blade pitch sufficient to load the engine equal to its delivered power for the selected constant speed. The opposite side of the torque unit is relieved by return of fluid through the passages 48 and 52, port 92 and then slot 198 to the reservoir 82. A domination of spring force, that is when the valve plunger moves inwardly, means decrease of propeller speed which opens the port 92 and its connected passages to the torque unit for effecting a decrease of blade pitch, the torque unit in turn being relieved to the reservoir through the other control passages and port 90 and 200 to the reservoir.

The foregoing will take place for any selected speed, and different speeds of propeller operation are selected by adjustment of the cockpit control. Assuming that the device as shown in Fig. 2 is set for top speed, such as initially required in take-off, when it is desired to adjust the propeller for climb, the cockpit control will be so manipulated so as to move the lever 174 in a direction to shift the fulcrum rollers 103 away from the springs 104. That movement of the lever 174 rotates the toothed flange 156 relative to the toothed flange 158 and effects relative rotation between the gears 152 and 154. As a result, one of the shafts 128 and 130 is rotated relative to the other which causes the pins 136 and 138 traveling along the slots 140 and 142 to move the bearing 120 and the carriage 108 engaged by it along the length of the concentric shafts. All of that takes place while the two gears 152 and 154 are rolling over the toothed flanges 156 and 158, with the result that the springs now have a greater advantage over the centrifugal force applied to the valve plunger and lever. Thus a new speed level for constant speed operation is selected. With respect to Fig. 2, movement of the fulcrum rollers to the extreme left of the figure may so position the fulcrum with respect to the line of spring force that the centrifugal and spring force will be in aiding relation so that the blades will move to feathered position. On the other hand, the fulcrum adjusting mechanism may be so proportioned that movement of the fulcrum to the extreme right of the figure will permit movement of the blades to the negative pitch position as in braking.

Figure 6:
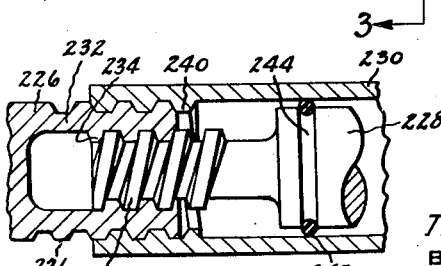
Fig. 6 is a view of a modified form of the carriage actuating connection.

Fig. 6 shows an alternative construction for the coupling between the gears 152, 154 and the fulcrum moving bearing 120. The inner race member 226 of the bearing 120 ends in a sleeve 232 threaded interiorly and exteriorly at 234 and 236 respectively for engagement with threaded portions 238 and 240 of the shaft members 228 and 230 to which the gears 152 and 154 respectively are fixed. Between the concentric shafts 228 and 230 there is a fluid seal 242 disposed in a groove 244 of the shaft 228, and the bearing and seal for the shafts supported by the member 72 is otherwise the same as shown in Fig. 2. In operation, relative rotation between the gears 152 and 154 will effect lineal movement of the part 226 in one direction, while relative rotation in the opposite sense will effect lineal movement in the other direction. Equal rotation of the two shafts will effect constant drive of the member 226 without lineal shift, and since the member 226 constitutes the inner race member of the bearing 120, which by the way is located in a plane at a slight angle from the perpendicular to the axis of the concentric shafts, and in the nature of a wabble-plate, effects a slight reciprocation or lineal vibration of the carriage 108 as the concentric shafts rotate, in the same manner as has been set forth hereinabove.

While the embodiment of the present invention as herein disclosed, constitutes a preferred form, it is to be understood that other forms might be adopted, all coming within the scope of the claims which follow.

What is claimed is as follows:

1. A regulator mechanism for adjusting the pitch of the blades to cause a propeller to operate at a selected constant speed, and comprising a governor unit, means for altering the limits of control by the governor unit so that a different selected constant speed may be selected, said altering means comprising a pair of concentric shafts relatively rotatable and provided with intersecting slots, bearing means supporting the shafts and governor unit in mechanically coupled relation, relatively fixed means constantly operable upon said shafts from a remote point for effecting relative rotation between the shafts, and a collar movable along the shafts and having pins following the slots of the shafts for translating relative rotation of the shafts to the mechanical coupling of the shafts and governor unit.

2. The combination set forth in claim 1, wherein the relatively fixed means normally effects coincident rotation of the concentric shafts within said journals while the regulator rotates.

3. In an aircraft propeller, a regulator mechanism for adjusting a rotatable device in accordance with predetermined characteristics, comprising the combination, a governor unit in said regulator mechanism for effecting control at a selected constant speed, means including a movable part of the governor unit for altering the limits of control by the governor unit so that the device may operate at a different constant speed, said altering means comprising a pair of relatively rotatable shafts journaled in the regulator and mounted for revolution as a unit with the governor unit, and adapted upon relative rotation to effect movement of said movable part, means supported from outside the regulator for rotating the shafts at equal speed when the regulator is rotating, and for selectively effecting differential rotation of the said shafts to adjust the governor for constant speed control at a selected speed.

4. A hydraulic regulator mechanism for adjusting a device in accordance with predetermined characteristics, comprising in combination a rotatable reservoir enclosing a quantity of fluid pressure responsive medium and fluid pressure actuated control mechanism, means mounting the reservoir for rotation, a governor valve assembly as part of the control mechanism and having a movable part for selecting the speed at which the regulator will effect control, means stationary with respect to the rotating reservoir for manipulating the movable part to preselect a speed of control, means including a pair of concentric shafts journaled on the regulator and extending into the reservoir, gears outside of the reservoir for the shafts, and racks carried by the stationary means normally to effect unitary rotation of said gears and shafts, one of said racks being selectively movable relative to the other for effecting relative rotation of the shafts, and means translating relative rotation of the shafts to lineal movement of the movable part.

5. The combination set forth in claim 4 in which the translating means includes cross-slots in the shafts and a collar with pins sliding in the shaft slots.

6. The combination set forth in claim 4 in which the translating means includes cross-slots in the shafts and a collar with pins sliding in the shaft slots, and fluid sealed bearing means carried by the reservoir wall for supporting the shafts, whereby the reservoir is sealed against loss of its fluid pressure responsive medium.

7. In a hydraulic regulator, having a rotatable reservoir for enclosing control apparatus and a quantity of fluid pressure operating medium, said control apparatus including a radially disposed governor valve comprising in combination a leverage adapted to assume an equilibrium position on balance of centrifugal force and spring force, a movable fulcrum engaged by the leverage for adjusting the balance point of the opposing forces on the valve and leverage, concentric differentially rotatable shafts extending through the wall of the reservoir into proximity of the fulcrum, means translating the differential rotation of the shafts to lineal movement of the fulcrum, a gear and relatively fixed rack for each concentric shaft exterior of the reservoir normally effecting equal rotation of the shafts, one of said racks being relatively movable from a remote point for effecting relative rotation of the gears and concentric shafts so that the fulcrum may be moved selectively.

8. The combination set forth in claim 7 wherein a cover provided by the reservoir encloses the gears and racks, and fluid seals are provided in the reservoir wall about the shafts and in the cover about the racks, whereby adjustment of the control elements within the reservoir is effected from a remote point without, yet the reservoir is maintained fluid tight against loss of pressure operating medium.

9. In a hydraulic regulator having a rotatable reservoir for enclosing control apparatus and a quantity of fluid pressure operating medium, with a gear pump within the reservoir with fluid connections for placing the operating medium under pressure and for circulating the medium to the control apparatus, said control apparatus including a radially disposed governor valve comprising in combination of leverage adapted to assume an equilibrium position on balance of centrifugal force and spring force, a movable fulcrum engaged by the leverage for adjusting the balance point of the opposing forces on the valve and leverage, an operating shaft on said pump extending through the wall of said reservoir and provided exterior thereof with an operating gear, concentric relatively rotatable shafts extending through the wall of the reservoir into proximity of the fulcrum, means translating the relative rotation of the shafts to lineal movement of the fulcrum, a gear and rack for each concentric shaft exterior of the reservoir normally effecting equal rotation of the shafts, one of said racks being movable relative to the other from a remote point for effecting relative rotation of the gears and concentric shafts, so that the fulcrum may be moved selectively, one of said racks being fixed relative to the reservoir for effecting rotation of the pump driving gear upon rotation of the reservoir.

10. The combination set forth in claim 9 wherein a cover member secured to the reservoir encloses the said gears and racks, and fluid seals are provided in the reservoir wall around the shafts.

11. A hydraulic regulator, comprising in combination, cooperating housing members providing an annular sealed reservoir, fluid passages provided by the housing members and having openings into the reservoir, governor mechanism and pump means mounted within the reservoir and having fluid connection with the fluid passages, shaft means journalled through one of the housing means for controlling the governor mechanism, and other shaft means through the housing means for actuating the pump means, means for sealing the journals of all the shaft means against leakage from the reservoir, and means exterior of the reservoir for actuating both of the shaft means so that fluid under pressure is delivered to the governor, and the governor is caused to control at a predetermined setting.

12. The combination set forth in claim 11 wherein an auxiliary cover means is supported by the reservoir and encloses the shaft actuating means and a running seal prevents leakage from the shaft enclosure.

13. A fluid pressure regulator mounted for rotation, and comprising a plurality of annular members cooperating to provide a rigidly closed annular reservoir surrounding and concentric with the axis of rotation, and adapted to retain a charge of pressure operating fluid, means sealing the junctures of the housing members against fluid leakage, fluid pressure control apparatus housed within the reservoir and including shafts journalled in one of the housing members to extend without the reservoir, means sealing the journals against leakage from the reservoir, fixed circular racks supported outside of the reservoir for actuating the shafts upon rotation of the regulator.

14. The combination set forth in claim 13 wherein a cover member secured to the housing members encloses the shaft actuating means, and a running seal disposed between the cover member and one of the circular racks.

15. An hydraulic regulator for a rotatable device, adapted to be mounted thereon and rotate therewith and distribute a source of fluid pressure to either one of a pair of control passages upon change in speed of rotation of the device, comprising in combination, cooperating members mounted on the device concentric with the axis of rotation providing a reservoir having an axially disposed annular opening surrounding the rotatable device, a governor valve assembly providing fluid supply and control ports for the control passages and having a landed valve cooperable therewith, said valve being disposed along a radius of rotation and responsive to change of speed in rotation of the device for moving in a radial direction, a lever and a spring adapted to restrain outward radial movement of the valve, a movable fulcrum engaged by the lever for altering the effect of the spring upon the valve, and means for shifting the fulcrum including a pair of concentric shaft elements, an annular cover member secured to the cooperating members for closing and sealing the axially disposed annular opening of the reservoir, fluid sealed bearings supporting the concentric shaft elements in the annular cover member, gear means operable from a fixed point with respect to said rotatable device for rotating the concentric shafts in unison and differentially, and operative connections between the concentric shafts and fulcrum for moving the fulcrum with respect to the lever and spring.

16. In a hydraulic regulator adapted to control the application of source pressure to a control passage, a governor unit comprising in combination, a porting sleeve having a pressure source port and a control port, a valve plunger responding to the balance of spring pressure and centrifugal force for controlling the communication between the source port and the control port, and including a lever and fulcrum, means for revolving the governor unit to subject the valve plunger to centrifugal force, means carried by the revolving means for shifting the fulcrum with respect to the lever, said shifting means including a pair of concentric rotatable shafts, relatively stationary means for rotating the shafts incident to revolution of the governor unit, and means coupling the shafts to the fulcrum whereby coincident rotation of the shafts effect minute fore and aft movement of the fulcrum relative to the lever for the elimination of static friction with respect to said valve plunger, and whereby differential rotation of said shafts effect substantially unidirectional movement of the fulcrum along the lever for selecting a different point of balance between spring pressure and centrifugal force at which the valve plunger will respond to control the control port.

17. The combination set forth in claim 16, in which reservoir housing members enclose the governor unit and provide bearings for the concentric shafts, and in which the relatively stationary means for rotating the shafts comprise a pair of toothed flanges and a gear on the end of each concentric shaft having rolling engagement with the toothed flanges such that during revolution of the governor the two concentric shafts normally rotate at equal speeds and in the same direction.

18. The combination set forth in claim 17, in which the means coupling the concentric shafts to the fulcrum include crossed slots of the shaft and a bushing with pins engaging the crossed slots, said bushing being attached to the fulcrum.

19. In a hydraulic regulator for a rotatable device having a porting sleeve and a cooperable valve plunger arranged for relative movement along a radius of rotation for the device for controlling the distribution of fluid under pressure from a supply port to a control port, the combination comprising a spring pressed lever pivotally connected to the valve plunger and normally assuming a radially inward position, a movable fulcrum supporting the other end of the lever, a ball bearing assembly having an outer race carried by the movable fulcrum and an inner race, a pair of concentric shafts having cross slots and pins carried by the inner race following the cross slots of the concentric shafts, and means remote from the rotatable device for differentially rotating the concentric shafts in such manner that the fulcrum is moved along the length of the lever.

20. In a hydraulic regulator for a rotatable device having a valve element movable radially of the axis of rotation in response to speed change of rotation for controlling the flow of fluid pressure from a supply port to a control port, adjustable means for selecting the radial position at which the valve element will effect control, comprising in combination a lever pivoted at one end to the radially inward end of the valve element, a ball bearing assembly having an outer race for supporting the other end of the lever, spring means engaging a mid point on the lever for urging the lever and valve element radially inward, means for altering the distance between the bearing support for the lever and the point of applied spring pressure including a tubular shaft threading through the inner race of the bearing support, said tubular shaft having a spiral groove and a pin carried by the inner race traversing the said spiral groove, a second shaft inwardly concentric of the tubular shaft and having a straight slot lengthwise thereof, with a pin carried by the inner race traversing the straight slot, a pair of pinions secured in driving relation to said shafts, a pair of concentric toothed flanges engaged by the said pinions and means for fixedly supporting the toothed flanges outside of the rotatable device, whereby rotation of the device will cause the pinions to roll over the toothed flanges and effect equal and unidirectional rotation of said shafts and means for rotating one of the toothed flanges relative to the other where differential rotation of the shafts will be effected while they are being driven by the rotating device, thus shifting the bearing support for the lever with respect to the point of spring pressure.

THOMAS B. MARTIN.

REFERENCES CITED

The following references are of record in the file of this patent:

UNITED STATES PATENTS

| Number | Name | Date |
|---|---|---|
| 2,307,102 | Blanchard | Jan. 5, 1943 |
| 2,379,537 | MacNeil | July 3, 1945 |
| 2,391,699 | Haines | Dec. 25, 1945 |
| 2,407,791 | Martin | Sept. 17, 1946 |

FOREIGN PATENTS

| Number | Country | Date |
|---|---|---|
| 703,319 | Germany | Mar. 6, 1941 |